United States Patent [19]

Tzikas et al.

[11] Patent Number: 5,371,200
[45] Date of Patent: Dec. 6, 1994

[54] FIBRE-REACTIVE FORMAZAN DYES, PROCESSES FOR THEIR PREPARATION AND THEIR USE

[75] Inventors: Athanassios Tzikas, Pratteln; Urs Lauk, Zürich, both of Switzerland

[73] Assignee: Ciba-Geigy Corporation, Ardsley, N.Y.

[21] Appl. No.: 78,805

[22] Filed: Jun. 17, 1993

Related U.S. Application Data

[63] Continuation of Ser. No. 604,554, Oct. 26, 1990, abandoned.

[30] Foreign Application Priority Data

Nov. 1, 1989 [CH] Switzerland ............... 3940/89-0

[51] Int. Cl.$^5$ ............................................. C09B 62/04
[52] U.S. Cl. ............................................. 534/618
[58] Field of Search ............................................. 534/618

[56] References Cited

U.S. PATENT DOCUMENTS

| | | | |
|---|---|---|---|
| 4,024,123 | 5/1977 | Dussy | 260/146 |
| 4,985,545 | 1/1991 | Himeno et al. | 534/618 |

FOREIGN PATENT DOCUMENTS

| | | | |
|---|---|---|---|
| 0219232 | 4/1987 | European Pat. Off. | 534/618 |
| 0315045 | 5/1989 | European Pat. Off. | 534/618 |
| 0315046 | 5/1989 | European Pat. Off. | 534/618 |
| 0333656 | 9/1989 | European Pat. Off. | |
| 2364764 | 7/1974 | Germany | 534/618 |
| 2557141 | 1/1976 | Germany | 534/618 |
| 2647312 | 4/1978 | Germany | |
| 3718397 | 12/1988 | Germany | |
| 3737536 | 5/1989 | Germany | |
| 0352222 | 1/1990 | Germany | 534/618 |
| 59-58059 | 3/1984 | Japan | 534/618 |
| 1241364 | 10/1986 | Japan | 534/618 |
| 2043465 | 2/1987 | Japan | 534/618 |
| 0318023 | 5/1989 | Japan | 534/618 |
| 1459453 | 12/1973 | United Kingdom | |
| 1566921 | 5/1980 | United Kingdom | |
| 2148921 | 6/1985 | United Kingdom | |
| 2172896 | 10/1986 | United Kingdom | |

| | | | |
|---|---|---|---|
| 8805065 | 7/1988 | WIPO | 534/618 |

OTHER PUBLICATIONS

CA89(14):112331c, Weiphal et al, "Reactive Dyes", DE2647312. 27 Apr. 1978. See esp. Registry #67029-1-6-7.

*Primary Examiner*—Marianne M. Cintins
*Assistant Examiner*—Keith MacMillan
*Attorney, Agent, or Firm*—Kevin T. Mansfield

[57] ABSTRACT

The fiber-reactive formazan dyes of the formula

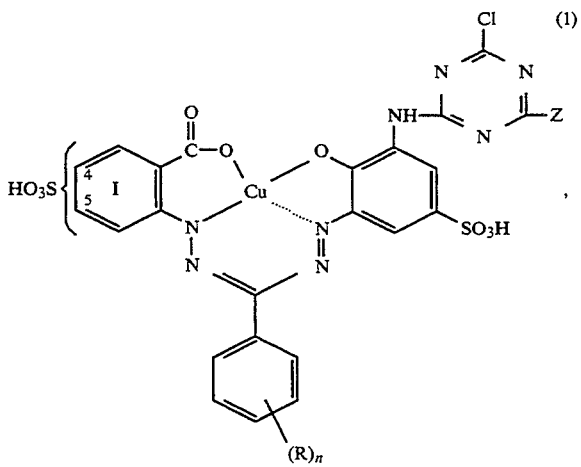

in which n is the number 0, 1, 2 or 3, $(R)_n$ is 0 to 3 substituents, independent of one another, from the group comprising halogen, $C_{1-4}$alkyl, $C_{1-4}$alkoxy, $C_{2-4}$alkanoylamino, hydroxyl, carboxyl and sulfo and Z is a radical of the formula

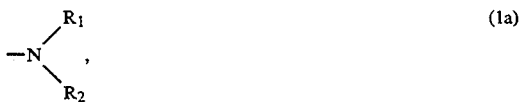

(Abstract continued on next page.)

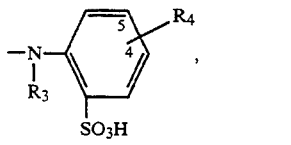 (1b)

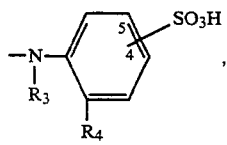 (1c)

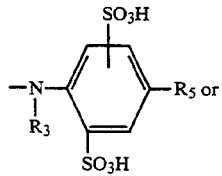 (1d)

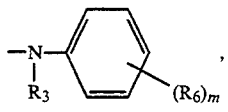 (1e)

in which $R_1$ is $C_{1-4}$alkyl, $R_2$ is $C_{1-4}$alkyl, which is substituted by hydroxyl, halogen, cyano, carboxyl, $C_{1-4}$alkoxy, hydroxy-$C_{2-4}$alkoxy, HO—(CH$_2$CH$_2$—O)$_{2-4}$—, sulfo or sulfato, $R_3$ is $C_{1-4}$alkyl, which can be substituted by hydroxyl, halogen, cyano, carboxyl, $C_{1-4}$alkoxy, hydroxy-$C_{2-4}$alkoxy, sulfo or sulfato, $R_4$ is hydrogen, halogen, $C_{1-4}$alkyl, $C_{1-4}$alkoxy, carboxyl or sulfo, $R_5$ is halogen, $C_{1-4}$alkyl or $C_{1-4}$alkoxy, m is the number 0, 1, 2 or 3 and $(R_6)_m$ is 0 to 3 substituents independent of one another, from the group comprising halogen, $C_{1-4}$alkyl, $C_{1-4}$alkoxy and carboxyl, and $R_4$ in formula (1b) and the sulfo group in formula (1c) is bonded to the phenyl ring in the 4- or 5-position, are particularly suitable for dyeing or printing cellulose-containing fiber materials by the processes customary for reactive dyes and give, at a high dyeing yield, dyeings and prints of good fastness properties.

5 Claims, No Drawings

FIBRE-REACTIVE FORMAZAN DYES, PROCESSES FOR THEIR PREPARATION AND THEIR USE

This application is a continuation of Ser. No. 07/604,554, filed Oct. 26, 1990, now abandoned.

The present invention relates to novel fiber-reactive formazan dyes, processes for their preparation and the use of these dyes for dyeing and printing fiber materials.

The present invention relates to fiber-reactive formazan dyes of the formula

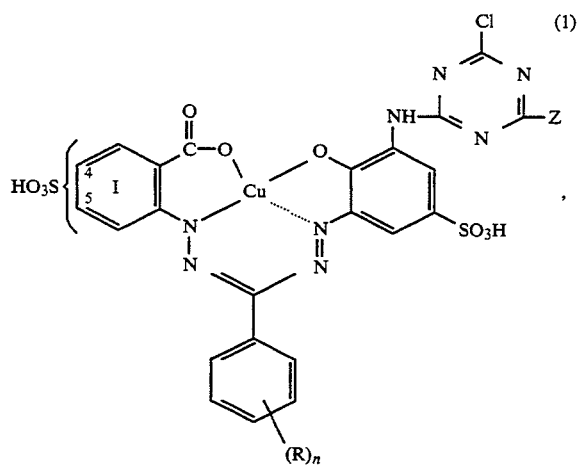

in which n is the number 0, 1, 2 or 3, $(R)_n$ is 0 to 3 substituents, independent of one another, from the group comprising halogen, $C_{1-4}$alkyl, $C_{1-4}$alkoxy, $C_{2-4}$alkanoylamino, hydroxyl, carboxyl and sulfo and Z is a radical of the formula

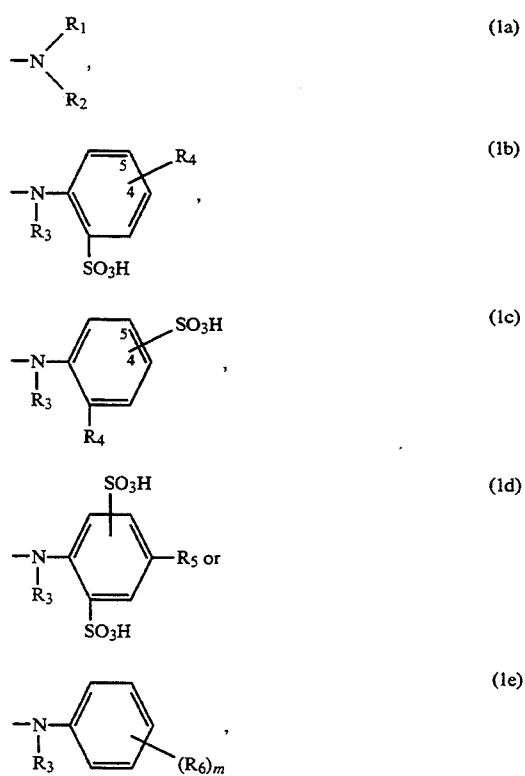

in which $R_1$ is $C_{1-4}$alkyl, $R_2$ is $C_{1-4}$alkyl, which is substituted by hydroxyl, halogen, cyano, carboxyl, $C_{1-4}$alkoxy, hydroxy-$C_{2-4}$alkoxy, $HO-(CH_2CH_2-O)_{2-4}-$, sulfo or sulfato, $R_3$ is $C_{1-4}$alkyl, which can be substituted by hydroxyl, halogen, cyano, carboxyl, $C_{1-4}$alkoxy, hydroxy-$C_{2-4}$alkoxy, sulfo or sulfato, $R_4$ is hydrogen, halogen, $C_{1-4}$alkyl, $C_{1-4}$alkoxy, carboxyl or sulfo, $R_5$ is halogen, $C_{1-4}$alkyl or $C_{1-4}$alkoxy, m is the number 0, 1, 2 or 3 and $(R_6)_m$ is 0 to 3 substituents independent of one another, from the group comprising halogen, $C_{1-4}$alkyl, $C_{1-4}$alkoxy and carboxyl, and $R_4$ in formula (1b) and the sulfo group in formula (1c) is bonded to the phenyl ring in the 4-or 5-position.

In the formula (1) and in the following formulae, the curved parentheses mean that the particular group can be bonded to the 4- or 5-position of the benzene ring I.

In the formula (1) and in the following formulae, the reactive dyes are shown in the form of their free acid. The invention of course also relates to the salts of the free acid. $C_{1-4}$Alkyl R in formula (1), $R_4$ in formula (1 a), $R_4$ in formula (1b), $R_5$ in formula (1d) and $R_6$ in formula (1e) is, for example, methyl, ethyl, propyl, isopropyl, butyl, tert-butyl, sec-butyl or isobutyl, in particular methyl.

$C_{1-4}$Alkoxy R in formula (1), $R_4$ in formula (1b), $R_5$ in formula (1d) and $R_6$ in formula (1e) is, for example, methoxy, ethoxy, propoxy, isopropoxy, butoxy, tert-butoxy, sec-butoxy or isobutoxy, in particular methoxy.

Halogen R in formula (1), $R_4$ in formula (1b), $R_5$ in formula (1d) and $R_6$ in formula (1e) is, for example, fluorine, bromine or, preferably, chlorine.

$C_{2-4}$Alkanoylamino R in formula (1) is, for example, acetylamino, propionylamino or butyrylamino.

$C_{1-4}$Alkyl $R_3$ in the formulae (1b), (1c) and (1d) is, for example, methyl, ethyl, propyl, isopropyl, sec-butyl, isobutyl, ten-butyl or n-butyl, it being possible for the alkyl radical $R_3$ to be further substituted as described.

$C_{1-4}$Alkyl $R_2$ which is substituted by hydroxyl, halogen, cyano, carboxyl, $C_{1-4}$alkoxy, hydroxy-$C_{2-4}$alkoxy, $HO-(CH_2CH_2-O)_{2-4}-$, sulfo or sulfato is, for example: β-sulfoethyl, β-hydroxyethyl, β-(β'-hydroxyethoxy)-ethyl, β-cyanoethyl, $HO-(CH_2CH_2-O)_2-CH_2CH_2-$, $HO-(CH_2CH_2-O)_3-CH_2CH_2-$ or $HO-(CH_2CH_2-O)_4-CH_2CH_2-$.

Reactive dyes of the formula (1) in which n is the number 0 are preferred.

The reactive dyes of the formula (1) in which the sulfo group is bonded to the benzene ring I in the 5-position are likewise preferred.

The reactive dyes of the formula

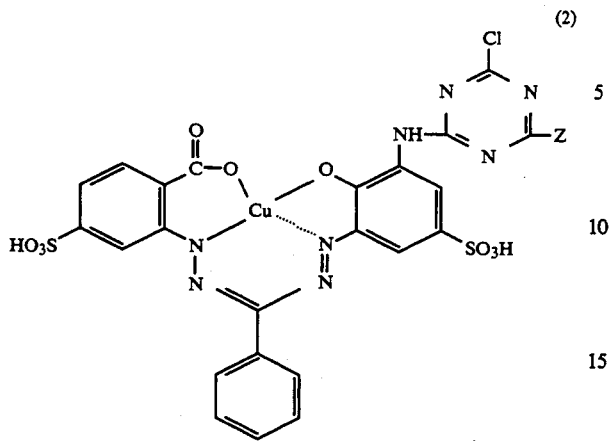

(2)

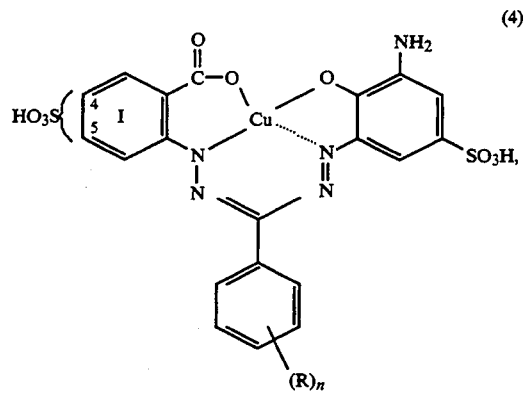

(4)

in which Z is as defined under formula (1), are particularly preferred.

The reactive dyes of the formula (2) in which Z is a radical of the formula (1 a), $R_1$ is methyl and $R_2$ is $\beta$-hydroxyethyl, $\beta$-sulfoethyl, $\beta$-sulfatoethyl, $\beta$-($\beta'$-hydroxyethoxy)-ethyl, HO—(CH$_2$CH$_2$—O)$_2$—CH$_2$CH$_2$—, HO—(CH$_2$CH$_2$—O)$_3$—CH$_2$CH$_2$— or HO—(CH$_2$CH$_2$—O)$_4$—CH$_2$CH$_2$—, are especially preferred.

Reactive dyes of the formula (2) in which Z is a radical of the formula (1e), $R_3$ is $C_{1-4}$alkyl, which can be substituted by sulfo, or hydroxy-$C_{2-4}$alkyl, m is the number 0 or 1 and $R_6$ is chlorine, $C_{1-4}$alkyl or $C_{1-4}$alkoxy, are likewise especially preferred.

Reactive dyes of the formula (2) in which Z is N-$C_{1-4}$alkylanilino, N-sulfomethylanilino, N-hydroxy-$C_{2-4}$alkylanilino, N-$C_{1-4}$alkylsulfoanilino, N-$C_{1-4}$alkyldisulfoanilino or N-$C_{1-4}$alkyldisulfotoluidino, are furthermore especially preferred.

The reactive dyes of the formula in which R and n are as defined under formula (1), with a compound which introduces the radical of the formula

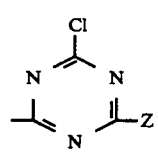

(5)

in which Z is as defined under formula (1), or first subjecting a compound of the formula (4) to a condensation reaction with a compound of the formula

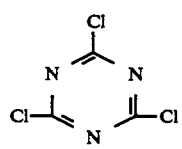

(6)

and then reacting the condensation product with a com- (3)

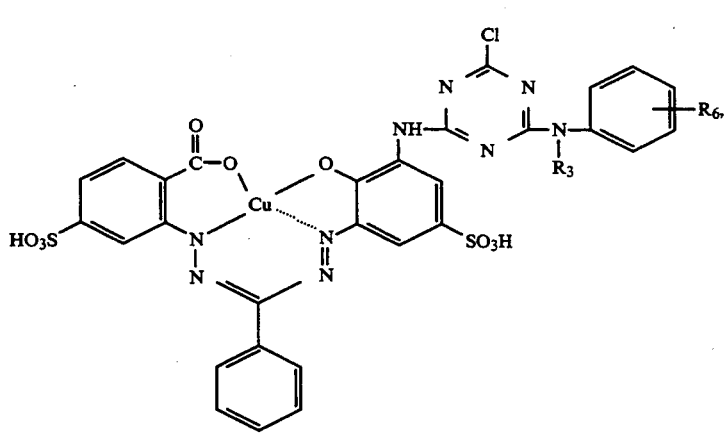

pound of the formula

H—Z (7)

in which Z is as defined under formula (1).

A preferred embodiment of the process according to the invention comprises using a compound of the formula (4) in which n is the number 0.

An embodiment of the process according to the invention which is likewise preferred comprises using a in which $R_3$ is methyl, ethyl, sulfomethyl, $\beta$-hydroxyethyl or $\beta$-hydroxy-n-butyl and $R_6$ is chlorine, methyl or ethyl, are particularly important.

The invention furthermore relates to a process for the preparation of the dyes of the formula (1), which comprises reacting a compound of the formula compound of the formula (4) in which the sulfo group is bonded to the benzene ring I in the 5-position as the starting substance.

A particularly preferred embodiment of the process according to the invention comprises using a compound of the formula (4) in which n is the number 0 and the sulfo group is bonded to the benzene ring I in the 5-position as the starting substance.

The especially preferred reactive dyes of the formula (2) are obtained by subjecting a compound of the formula (4) in which n is the number 0 and the sulfo group is bonded to the benzene ring I in the 5-position to a condensation reaction with 2,4,6-trichlorotriazine and then reacting the primary condensation product with a compound of the formula (7) in which Z is a radical of the formula (1a), $R_1$ is methyl and $R_2$ is β-hydroxyethyl, β-sulfoethyl, β-sulfatoethyl, β-(β'-hydroxyethoxy)-ethyl or HO—$(CH_2CH_2$—$O)_{2-4}$—$CH_2CH_2$—, or in which Z is a radical of the formula (1 e), $R_3$ is $C_{1-4}$alkyl, which can be substituted by sulfo, or hydroxy-$C_{2-4}$alky, m is the number 0 or 1 and $R_6$ is chlorine, $C_{1-4}$alkyl or $C_{1-4}$alkoxy, or in which Z is N-$C_{1-4}$alkylanilino, N-sulfomethylanilino, N-hydroxy-$C_{2-4}$alkylanilino, N-$C_{1-4}$alkylsulfoanilino, N-$C_{1-4}$alkyldisulfoanilino or N-$C_{1-4}$alkyldisulfotoluidino.

The especially important reactive dyes of the formula (3) are obtained by subjecting a compound of the formula (4) in which Z is the number 0 and the sulfo group is bonded to the benzene ring I in the 5-position to a condensation reaction with 2,4,6-trichloro-s-triazine and then reacting the primary condensation product with a compound of the formula (7) in which Z is a radical of the formula (1e), $R_3$ is methyl, ethyl, sulfomethy, β-hydroxyethyl or β-hydroxy-n-butyl and $R_6$ is chlorine, methyl or ethyl.

The compounds of the formula (4) are known per se or can be prepared analogously to known compounds. Reference is made to K. Venkataraman, The Chemistry of Synthetic Dyes, Volume VI, pages 287 to 297, Academic Press New York and London (1972) and Ullmanns Enzyklopädie der technischen Chemie (Ullmann's Encyclopaedia of Industrial Chemistry), Volume 11, pages 714 to 718, Verlag Chemie (1976) for the preparation of the copper complexes of the tetradentate formazans.

The compounds which introduce the radical of the formula (5) and the compounds of the formulae (6) and (7) are likewise known per se or can be prepared analogously to known compounds.

The individual process steps in the preparation of such triazine dyes can be carded out in varying sequence, and if appropriate in some cases also simultaneously. Various process variants are possible here. In general, the reaction is carded out stepwise in succession. The possible process variants which give the best results or the specific conditions, for example the condensation temperature, under which the reaction is most advantageously to be carried out depend on the structure of the starting substances.

The condensation of the 2,4,6-trichloro-s-triazine with a compound of the formula (4) is preferably carded out in aqueous solution or suspension at low temperatures, preferably between 0° and 5° C., and at a weakly acid, neutral to weakly alkaline pH. The hydrogen chloride liberated during the condensation is advantageously neutralized continuously by addition of aqueous alkali metal hydroxides, carbonates or bicarbonates. The free amines or salts thereof, preferably in the form of the hydrochloride, are employed for further reaction of the chlorotriazine dyes thus obtained or for reaction of the 2,4,6-trichloro-s-triazine with the amines of the formula (7). The reaction is carried out at temperatures between about 0° and 40° C., preferably between 5° and 25° C, with the addition of acid-binding agents, preferably sodium carbonate or an excess of the amine, in a pH range from 2 to 10, preferably 5 to 8.

The reactive dyes of the formula (1) can be isolated and processed to useful dry dyeing preparations. They are preferably isolated at the lowest possible temperatures by salting out and filtration. The filtered dyes can be dried, if appropriate after addition of extenders and/or buffers, for example after addition of a mixture of equal parts of mono- and disodium phosphate or of sodium tripolyphosphate; the drying is preferably carded out at temperatures which are not too high, under reduced pressure. In certain cases, the dry preparations according to the invention can be prepared directly, that is to say without intermediate isolation of the dyes, by spray drying the entire preparation mixture.

The invention furthermore relates to storage-stable concentrated liquid dye preparations of the reactive dyes of the formula (1) and their use for the preparation of padding liquors, dyebaths and in particular printing pastes, which are used for dyeing and printing fiber materials, in particular cellulose-containing fiber materials.

Liquid dye preparations have advantages over the powder form, for example no dust formation when preparing printing pastes and padding liquors and dye liquors, no wetting problems due to the formation of lumps, and no speckled dyeings due to undissolved dye particles. Such liquid formulations should be highly concentrated (a dye content of at least 10% by weight, and preferably more than 15% by weight) and it should be possible to store them unchanged for at least several months in a wide temperature range ($-10°$ to $+40°$ C.). In particular, the liquid formulations contain 20 to 50, preferably 35 to 40, % by weight of dye.

The aqueous solution or suspension, which may contain solvent, obtained directly from the synthesis or an aqueous suspension of the moist press cake or filter cake of the crude dyes of varying content of undesirable dissolved substances of low molecular weight, in particular of the by-products obtained in the synthesis of the dye and dissolved inorganic and organic salts, can be used as the starting solution or suspension for the preparation of the dye preparations. In cases where the condensation product can be salted out only with extreme difficulty, if at all, the crude condensation or neutralization solution can also be used directly. Starting solutions or suspensions which contain 2 to 50% of dye are advantageously used.

However, it is also possible to use the dry crude dye powder as the starting substance, if this is first suspended in water.

The concentrated liquid preparations according to the invention are as a rule true or colloidal solutions. They are mobile (viscosity of about 5 to 300 cp/20° C.) and have a good storage stability, that is to say they remain in the ready-to-use state for at least several months at temperatures of $-20°$ to $+60°$ C., in particular $-10$ to $+40°$ C. During the preparation of padding liquors, dyebaths and printing pastes, either water or organic solvents and/or thickeners can be added to these preparations without the dye precipitating or without other inhomogeneities occurring. Textile materials of naturally occurring or synthetic, in particular cellulose-containing fiber materials, for example, can be dyed or printed in a known manner using the padding liquors, dyebaths and printing pastes mentioned.

The stable concentrated liquid dye preparations according to the invention are particularly suitable for the preparation of printing pastes for printing cellulose fiber materials and for continuous dyeing processes.

One process for the preparation of a liquid preparation according to the invention is known, for example, from European Patent A-0,333,656, the dye solution being desalinated and concentrated on a unit for reverse osmosis.

The use of membrane-related filtering techniques for the preparation of formulations of water-soluble organic dyes is known. The process starts from the aqueous suspensions of the crude dye, which are largely freed from water-soluble by-products and in which the salt content is reduced approximately to half with the aid of a first membrane separation process; a second membrane separation process then follows.

In this first membrane separation process, the soluble by-products and some of the salts thus permeate through a membrane, whilst the dye and water-insoluble portions are retained.

In the second membrane separation process, the dye suspension - if appropriate after dilution with water-is then desalinated and concentrated and finally converted into a ready-to-sell liquid or solid dye formulation.

The dye solutions employed according to the invention as a rule have a dye content of 5 to 20% by weight and a salt content (inorganic salts) of 1 to 20% by weight, in particular 1 to 10% by weight. The pH is as a rule in the range from 3 to 10, preferably 3 to 9. Insoluble portions are separated off by microfiltration and the concentration and desalination are carried out until a dye content of 10 to 50% by weight is reached. During this procedure, the salt content drops to below 5% by weight, for example 0.05 to 5% by weight, and preferably below 1% by weight, for example 0.05 to 1% by weight.

To prepare a ready-to-sell liquid form, the concentrated aqueous dye formulation is to be brought to a given final dye content merely by dilution and/or with the aid of extenders, if appropriate after addition of components customary for liquid formulations, such as solubilizers, foam suppressants, antifreeze agents, humectants, surfactants, buffer substances and/or antimicrobial agents, and after adjustment of the pH. However, the dye formulation can also be convened into a solid dye preparation by dehydration, if appropriate after addition of additives, such as binders, dust removal agents, wetting agents, buffer substances, such as alkali metal polyphosphates, disodium hydrogen phosphate, citric acid and/or ethylenediaminetetraacetic acid, and/or extenders. Because of the increased dye concentration, less energy is required for drying. Customary drying processes, in particular spray drying, are used.

The pH of the ready-to-sell liquid formulation of the reactive dyes is as a rule adjusted by addition of buffer substances. The pit is in the range of about 7.0 to 8.5, preferably 8.0.

It is of course possible for the dyeing assistants or additives mentioned not only to be added to the dye solution before final formulation thereof as the commercial form but to be introduced into the solution of the crude dye even before or during the process according to the invention, and they are thus at least in some cases already present in the dye solution from which the final ready-to-sell dye formulation is prepared (for example solubilizers, solvents, surfactants and the like). Addition during the process is of course only appropriate if the dyeing assistant or assistants or additive or additives are not completely removed from the solution again by one of the membrane separation processes.

The concentrated liquid preparations, according to the invention, of the reactive dyes of the formula (1) thus contain 10 to 50% by weight of dye, 0.05 to 5% by weight of an inorganic salt, for example NaCl, KCl or LiCl, buffer substances, for example mono- and disodium phosphate or sodium tripolyphosphate or mixtures of buffer substances, in an amount so that a pH of between 7.0 and 8.5 can be established, and water.

The reactive dyes of the formula (1) are distinguished by a high reactivity and they produce dyeings having good wet and light fastness properties. It is to be particularly emphasized that the dyes display a good solubility and high fixing of the dye, that they diffuse well into the cellulose fiber and that the non-fixed portions can easily be removed.

The reactive dyes of the formula (1) are suitable for dyeing and printing widely varying materials, such as silk, leather, wool, polyamide fibers and polyurethanes, but in particular cellulose-containing materials of a fibrous structure, such as linen, cellulose, regenerated cellulose and especially cotton. They are suitable both for the exhaustion process and for dyeing by the pad-dyeing process, in which the goods are impregnated with aqueous dye solutions, which also contain salts if appropriate, and the dyes are fixed, if appropriate under the action of heat, after an alkali treatment or in the presence of alkali.

They are particularly suitable for printing textile cellulose-containing fiber materials, in particular cotton, but also for printing nitrogen-containing fibers, for example wool, silk or mixed fabrics containing wool. They are particularly suitable for gentle printing processes, for example using sodium propionate as the fixing alkali.

It is advisable to subject the dyeings and prints to thorough rinsing with cold and hot water, if appropriate with the addition of a dispersing agent which promotes diffusion of the non-fixed portions.

When used in practice, the dyes according to the invention are advantageously employed as liquid dyeing or printing preparations.

In the following examples, the parts are by weight. The temperatures are degrees Celsius. Parts by weight bear the same relation to parts by volume as the gram to the cubic centimeter.

EXAMPLE 1

A neutral solution of 30.0 parts of the formazan compound which, in the form of the free acid, has the formula

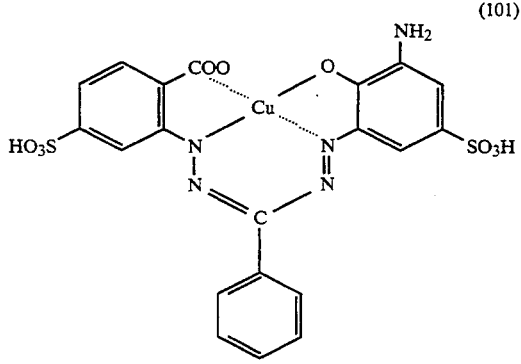

in 400 parts of water are allowed to run into a finely ground suspension of 9.4 parts of cyanuric chloride in 25 parts of water so that the pH can be kept at 4.5 by simultaneously metering in 1N sodium hydroxide solution. The temperature is kept at 0 to 5° by cooling. When the end of the first condensation reaction has been detected by chromatography, a solution of 7.0 parts of N-methyltaurine in 65 parts of water is poured in all at once. By addition of sodium hydroxide solution, the pH is brought to 8.5, and is kept at 8.5 after the mixture has been heated up to 40°. After the end of the second condensation reaction, the pH is brought to 7.0 with hydrochloric acid of low concentration. After desalination and evaporation, a black-blue powder of a dye which, in the form of the free acid, has the formula

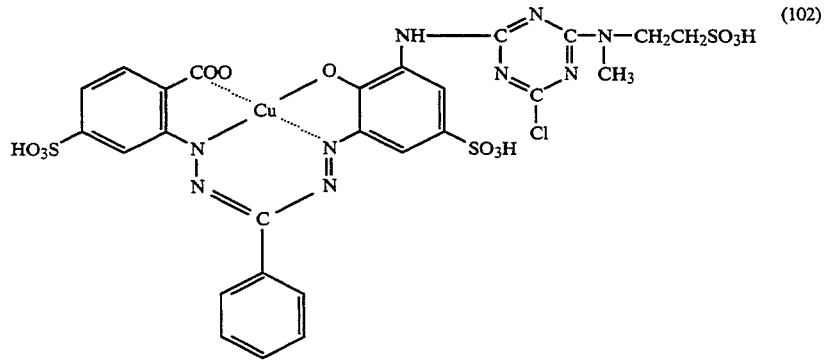

is obtained.

Cotton can be printed or dyed in very fast clear neutral blue shades with the resulting dye.

Other useful dyes are obtained by the process described if equivalent amounts of the amines listed below are used instead of N-methyltaurine.

| Example | Amine | Colour shade |
|---|---|---|
| 2 | N-Methylethanolamine | blue |
| 3 | N-Methyl-β-(β'-hydroxyethoxy)ethylamine | blue |
| 4 | N-Methylaniline | blue |
| 5 | N-Ethylaniline | blue |
| 6 | N-Sulfomethylaniline | blue |
| 7 | N-Methyl-o-toluidine | blue |
| 8 | N-Ethyl-o-toluidine | blue |
| 9 | N-Methyl-o-ethylaniline | blue |
| 10 | N-Ethyl-o-ethylaniline | blue |
| 11 | N-β-Hydroxyethylaniline | blue |
| 12 | N-β-Hydroxy-n-butylaniline | blue |
| 13 | N-β-Hydroxy-n-butyl-o-chloraniline | blue |
| 14 | N(CH$_3$)—(CH$_2$CH$_2$—O)$_2$—CH$_2$CH$_2$—OH | blue |
| 15 | N(CH$_3$)—(CH$_2$CH$_2$O)$_3$—CH$_2$CH$_2$—OH | blue |
| 16 | N(CH$_3$)—(CH$_2$CH$_2$O)$_4$—CH$_2$CH$_2$—OH | blue |
| 17 | N-Methyl-4-sulfoaniline | blue |
| 18 | N-Methyl-3-sulfoaniline | blue |
| 19 | N-Methyl-2,5-disulfoaniline | blue |
| 20 | N-Methyl-2,5-disulfo-4-methylaniline | blue |
| 21 | N-Methyl-m-toluidine | blue |
| 22 | N-Methyl-2,4-disulfoaniline | blue |

If the procedure is as described in Examples 1 to 22, but a compound of the formula

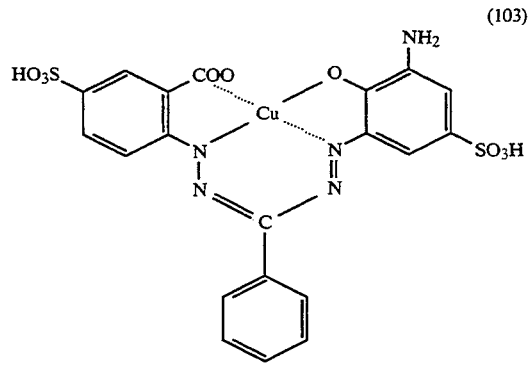

is used instead of the formazan compound mentioned above, dyes having similarly good properties which dye cotton in a similar color shade are obtained.

Preparation of a concentrated liquid dye preparation 9 kg of press cake of the crude dye of the formula from Example 1 are suspended in 35 kg of water. The resulting suspension has a dry content of 7.9% (about 5.9% of dye and 2.07 of NaCl) and is desalinated and concentrated in a unit for reverse osmosis (0.84 m$^2$ membrane area), which has been produced as described in European Patent A-59,782 and has a "cut-off level" of 500. The reverse osmosis is carried out in two stages at pH 6.5–7.5 and 20° C. under a pressure of 25 bar:

a) Desalination

After addition of 40 l of water and subsequent removal of 40 l of permeate (average flow about 20 l/hour), a dye solution having a salt content of 0.43% is obtained.

b) Concentration

After desalination, 33.1 l of permeate (average flow about 12 l/hour) are removed. 10.9 kg of a concentrated dye solution having a dry content of 23.6%, the sodium chloride content of which is less than 0.01%, are obtained.

1.5 parts of sodium tripolyphosphate are added to 94.4 parts of the resulting dye solution at 40° C. in the course of 10 minutes, while stirring, and the mixture is diluted with 4.2 parts of water. This gives a liquid formulation having a pH of 7.0 and the following composition:

22.3% by weight of dye,
1.5% by weight of sodium tripolyphosphate,
about 76.3% by weight of water and
<0.1% by weight of sodium chloride.

The true solution formed is mobile (about 6 cP at 20° C., Brookfield, spindle No. 2) and can be stored unchanged for several months at −10° C. to +40° C. (Chemical and physical storage stability)

Instead of the press cake used in the above example, it is also possible to use an equivalent amount of the neutralized synthesis solution (if necessary after appropriate adjustment of the concentration).

The liquid commercial form thus prepared can be used in all dyeing and printing recipes instead of the pulverulent dye, the same results being obtained.

Dyeing instructions 1

2 parts of the dye obtained according to Example 1 are dissolved in 100 parts of water at 20° to 50° C. with the addition of 5 to 20 parts of urea and 2 parts of anhydrous $Na_2CO_3$. A cotton fabric is impregnated with the resulting solution so that it increases by 50 to 80% of its weight, and is then dried. Thereafter, the dyeing is thermofixed at 140° to 210° C. for 1 ½ to 5 minutes and then soaped in a 0.1% solution of an ion-free detergent at the boiling point for quarter of an hour, rinsed and dried.

Dyeing instructions 2

2 parts of the dye obtained according to Example 1 are dissolved in 2000 parts of water at 75° C. with the addition of 120 parts of NaCl or anhydrous $Na_2SO_4$. 100 parts of a cotton fabric are introduced into this dyebath and the temperature is kept constant for 30 to 60 minutes. Thereafter, 10 parts of anhydrous $Na_2CO_3$ and 4 ml of 30% sodium hydroxide solution are added. The temperature is kept at 75° to 80° C. for a further 45 to 60 minutes and the dyeing is then soaped in a 0.1 solution of an ion-free detergent at the boiling point for 15 minutes, rinsed and dried.

Dyeing instructions 3

2 parts of the dye obtained according to Example 1 are dissolved in 100 parts of water with the addition of 0.5 pan of sodium m-nitrobenzenesulfonate. A cotton fabric is impregnated with the resulting solution so that it increases by 75% of its weight, and is then dried. Thereafter, the fabric is impregnated with a warm solution, at 20° C., containing 5 g of sodium hydroxide and 300 g of sodium chloride per liter and squeezed off to a weight increase of 75%, and the dyeing is steamed at 100 to 101° C. for 30 seconds, rinsed, soaped in a 0.3% solution of an ion-free detergent at the boiling point for a quarter of an hour, rinsed and dried.

Dyeing instructions 4

2 parts of the dye obtained according to Example 1 are dissolved in 100 parts of water. The solution is added to 1900 parts of cold water, 60 parts of sodium chloride are added and 100 parts of a cotton fabric are introduced into this dyebath. The temperature is increased to 60° C., 40 parts of anhydrous $Na_2CO_3$ and a further 60 parts of sodium chloride being added after 30 minutes. The temperature is kept at 60° C. for 30 minutes and the dyeing is then rinsed and soaped in a 0.3% solution of an ion-free detergent at the boiling point for 15 minutes, rinsed and dried.

Printing instructions 1

2 parts of the dye prepared according to Example 1 are sprinkled, with rapid stirring, into 100 parts of a stock thickener containing 45 parts of 5% sodium alginate thickener, 32 parts of water, 20 parts of urea, 1 part of sodium m-nitrobenzenesulfonate and 2 parts of sodium carbonate. A cotton fabric is printed with the resulting printing paste on a roller printing machine and the resulting printed material is steamed at 100° C. in saturated steam for 4 to 8 minutes. The printed fabric is then rinsed thoroughly in cold and hot water, during which the portions which have not been fixed chemically can be removed very easily from the fiber, and then dried.

Printing instructions 2 a) A stock thickener is prepared as follows:
500 kg of a 5% Na alginate solution of high viscosity are mixed thoroughly with 125 kg of urea,
12.5 kg of Na salt of the nitrobenzenesulfonate,
75 kg of a 25% $Na_2CO_3$ solution and
287.5 kg of water
in a container by means of a stirrer.

b) 200 g of the liquid formulation of the reactive dye described in Example 1 are now stirred manually into 800 g of this stock thickener. A ready-to-use homogeneous printing ink is obtained. A fabric of mercerized, bleached cotton is printed with some of this printing ink.

20 g of the remainder of the printing ink are weighed and again mixed manually with 980 g of the above stock thickener, and a fabric of mercerized, bleached cotton is likewise printed with this ink.

After drying, the two prints are fixed in saturated steam and then rinsed in cold and hot water.

A deep, brilliant level colour motif results from the first printing, and a pastel-coloured, absolutely speck-free level motif results from the second printing.

Printing instructions 3

6 parts of the reactive dye of the formula (102) from Example 1 are sprinkled, with rapid stirring, into 94 parts of a stock thickener containing 50 parts of 5% sodium alginate thickener, 39.4 parts of water, 3.5 parts of sodium propionate, 1 part of sodium m-nitrobenzenesulfonate and 0.1 pan of 40% aqueous formaldehyde solution. A mercerized cotton fabric is printed with the printing paste thus obtained and the resulting printed material is dried and steamed at 103° C. in saturated steam for 8 minutes. The printed fabric is then rinsed and subsequently dried. A blue print is obtained.

What is claimed is:

1. A fiber-reactive formazan dye of the formula

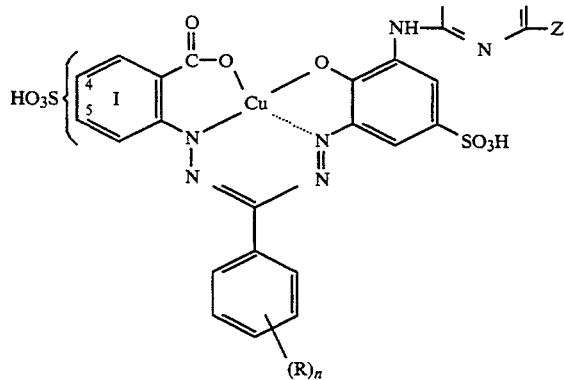

in which n is the number 0, 1, 2 or 3, $(R)_n$ is 0 to 3 substituents which are independently of one another, selected from the group consisting of halogen, $C_{1-4}$alkyl, $C_{1-4}$alkoxy, $C_{2-4}$alkanoylamino, hydroxyl, carboxyl and sulfo and Z is a radical of the formula

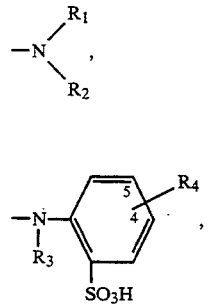

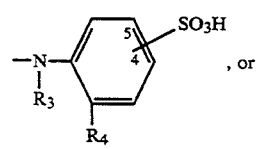

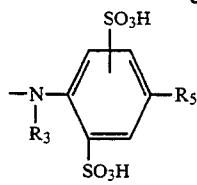

in which $R_1$ is $C_{1-4}$alkyl, $R_2$ is $C_{2-4}$alkyl, which is substituted by hydroxyl, halogen, cyano, carboxyl, $C_{1-4}$alkoxy, hydroxy-$C_{2-4}$alkoxy, HO—$(CH_2CH_2-O)_{2-4}$—, sulfo or sulfato, $R_3$ is $C_{1-4}$alkyl, which can be substituted by hydroxyl, halogen, cyano, carboxyl, $C_{1-4}$alkoxy, hydroxy-$C_{2-4}$alkoxy, sulfo or sulfato, $R_4$ is hydrogen, halogen, $C_{1-4}$alkyl, $C_{1-4}$alkoxy, carboxyl or sulfo, $R_5$ is halogen, $C_{1-4}$alkyl or $C_{1-4}$alkoxy, and $R_4$ in formula (1b) and the sulfo group in formula (1c) are bonded to the phenyl ring in the 4- or 5-position.

2. A fiber-reactive formazan dye according to claim 1, in which n is the number 0.

3. A fiber-reactive formazan dye according to claim 1, in which the sulfo group is bonded to the benzene ring I in the 5-position.

4. A fiber-reactive formazan dye according to claim 1, of the formula

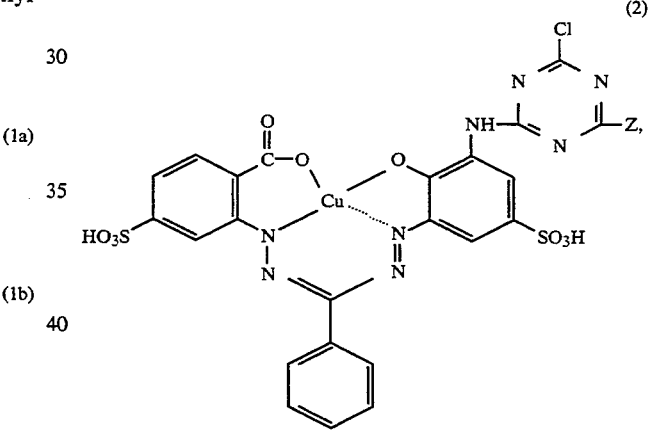

in which Z is as defined in claim 1.

5. A fiber-reactive formazan dye according to claim 4, in which Z is a radical of the formula (1a), $R_1$ is methyl and $R_2$ is β-hydroxyethyl, β-sulfoethyl, β-sulfatoethyl, β-(β'-hydroxyethoxy)-ethyl, HO—(CH₂CH₂—O)₂—CH₂CH₂—, HO—(CH₂CH₂—O)₃—CH₂CH₂— or HO—(CH₂CH₂—O)₄—CH₂CH₂—.

* * * * *